United States Patent
Chiu

(12) 
(10) Patent No.: US 10,358,802 B2
(45) Date of Patent: Jul. 23, 2019

(54) SHOWER HEAD WATER COLLECTION STRUCTURE

(71) Applicant: SAVE WATER DOT CO.,LTD, Taoyuan (TW)

(72) Inventor: Hsi-Ying Chiu, Taoyuan (TW)

(73) Assignee: SAVE WATER DOT CO., LTD., Taoyuan (TW)

( * ) Notice: Subject to any disclaimer, the term of this patent is extended or adjusted under 35 U.S.C. 154(b) by 0 days.

(21) Appl. No.: 15/795,392

(22) Filed: Oct. 27, 2017

(65) Prior Publication Data
US 2018/0202135 A1   Jul. 19, 2018

(30) Foreign Application Priority Data

Jan. 17, 2017   (TW) .............................. 106200859 U

(51) Int. Cl.
| | |
|---|---|
| *E03C 1/04* | (2006.01) |
| *E03C 1/06* | (2006.01) |
| *E03C 1/02* | (2006.01) |
| *E03B 1/04* | (2006.01) |
| *B05B 14/00* | (2018.01) |
| *B05B 12/00* | (2018.01) |

(52) U.S. Cl.
CPC .......... *E03C 1/0408* (2013.01); *B05B 12/004* (2013.01); *B05B 14/00* (2018.02); *E03B 1/048* (2013.01); *E03C 1/021* (2013.01); *E03C 1/06* (2013.01); *E03C 2001/0418* (2013.01)

(58) Field of Classification Search
CPC ............................... E03C 1/0408; E03B 1/048
USPC ....................................................... 4/567–570
See application file for complete search history.

(56) References Cited

U.S. PATENT DOCUMENTS

| | | | | |
|---|---|---|---|---|
| 4,245,666 A | * | 1/1981 | Norris ..................... | E04D 13/00 137/357 |
| 5,862,544 A | * | 1/1999 | Placencia .................. | E03C 1/02 4/597 |
| 2007/0067902 A1 | * | 3/2007 | Miller ....................... | E03C 1/06 4/567 |
| 2013/0048104 A1 | * | 2/2013 | Li .......................... | E03B 1/048 137/386 |
| 2017/0181583 A1 | * | 6/2017 | Chiu ....................... | B05B 14/40 |

* cited by examiner

*Primary Examiner* — Christine J Skubinna
(74) *Attorney, Agent, or Firm* — Aeon Law, PLLC; Adam L.K. Philipp; Martin S. Garthwaite

(57) ABSTRACT

A shower head water collection structure includes a curved pendant, a fixing member, a temperature sensor, a temperature display, a pipe, and a water collection tank. The curved pendant is a hollow housing having a semi-circular arc shape. The curved pendant has an opening at a top thereof and a plurality of through holes at a bottom thereof. One side of the curved pendant is recessed downward from the top to form a curved groove portion for placement of a shower head. The temperature display displays the temperature of the water flowing out of the shower head detected by the temperature sensor. The pipe has one end connected to the bottom of the curved pendant and another end connected to the water collection tank. The initial water flow of the shower head flows through the through holes and the pipe to the water collection tank for recycling.

9 Claims, 6 Drawing Sheets

SHOWER HEAD WATER COLLECTION STRUCTURE

FIELD OF THE INVENTION

The present invention relates to a shower head water collection structure, and more particularly to a shower head water collection structure that can collect the initial cold water flowing out of a shower head for recycling and is provided with a temperature display to display the temperature of the water flowing out of the shower head.

BACKGROUND OF THE INVENTION

In the past, people may take a bath for bathing. With the advent of a shower head, people may take a shower for bathing these days.

A conventional shower head structure is provided with a hollow handle on the water outlet. The distal end of the handle is connected to a faucet through a hose, so that the water flow can be ejected in the form of spray or water column from the water outlet for the user to take a shower.

However, in some apparatuses, the water pathway from the water pipe or water tower to the shower head is too long, or in some apparatuses, it is necessary to wait the water heater to heat the water for a long time. Most of the initial water flow from the shower head is cold water. At present, the user may let the cold water flow to the drain, resulting in a waste of the water resource. Moreover, the user may test the temperature of the initial water flowing out of the shower head with his/her hand or foot in order to ensure that there is hot water to be used, as the basis for regulation of water temperature. This way has a potential risk. When the water temperature is too high, the user cannot respond immediately. Sometimes, the hot water may scald the user's skin.

Accordingly, the inventor of the present invention has devoted himself based on his many years of practical experiences to solve these problems. Through the related design of the equipment, the initial water flow from the shower head can be reused, and the temperature of the water from the shower head can be displayed immediately, so that the water won't be wasted and the user won't have a scald by accident.

SUMMARY OF THE INVENTION

In view of the problems of the prior art, the primary object of the present invention is to provide a shower head water collection structure that can collect the initial cold water flowing out of a shower head for recycling and is provided with a temperature display to display the temperature of the water flowing out of the shower head.

In order to achieve the aforesaid object, the shower head water collection structure of the present invention comprises a curved pendant, a temperature sensor, a temperature display, and a pipe. The curved pendant is a hollow housing. The curved pendant has an opening at a top thereof and a plurality of through holes at a bottom thereof. One side of the curved pendant is recessed downward from the top to form a curved groove portion. The curved groove portion is configured for placement of a shower head. The temperature sensor is disposed on the curved pendant. The temperature display is disposed on the curved pendant and connected with the temperature sensor. The pipe has one end connected to the bottom of the curved pendant.

According to the technical feature described above, the curved pendant is provided with a plurality of lugs. The lugs are fixed to a wall or a seat through fixing members, respectively.

The shower head water collection structure of the present invention has the following advantages:

1. The present invention provides the curved pendant mounted to the wall or the seat for placement of the shower head. Through the design of a water collection device disposed on the seat or the wall and connected with the pipe, the present invention can effectively collect the initial cold water flowing out of the shower head. The present invention can retain the shower head and collect the initial cold water flowing out of the shower head to save water.

2. The present invention provides the temperature sensor to sense the temperature of the water flowing out of the shower head and the temperature display to display the temperature of the water flowing out of the shower head. Through the present invention, there is no need for the user to test the water temperature by hand, thereby avoiding a scald.

3. The present invention provides the opening disposed on the top of the curved pedant and the curved groove portion disposed at the side of the curved pedant, so that the user can hang or take the shower head easily and quickly.

DESCRIPTION OF THE PREFERRED EMBODIMENTS

Figure 1:
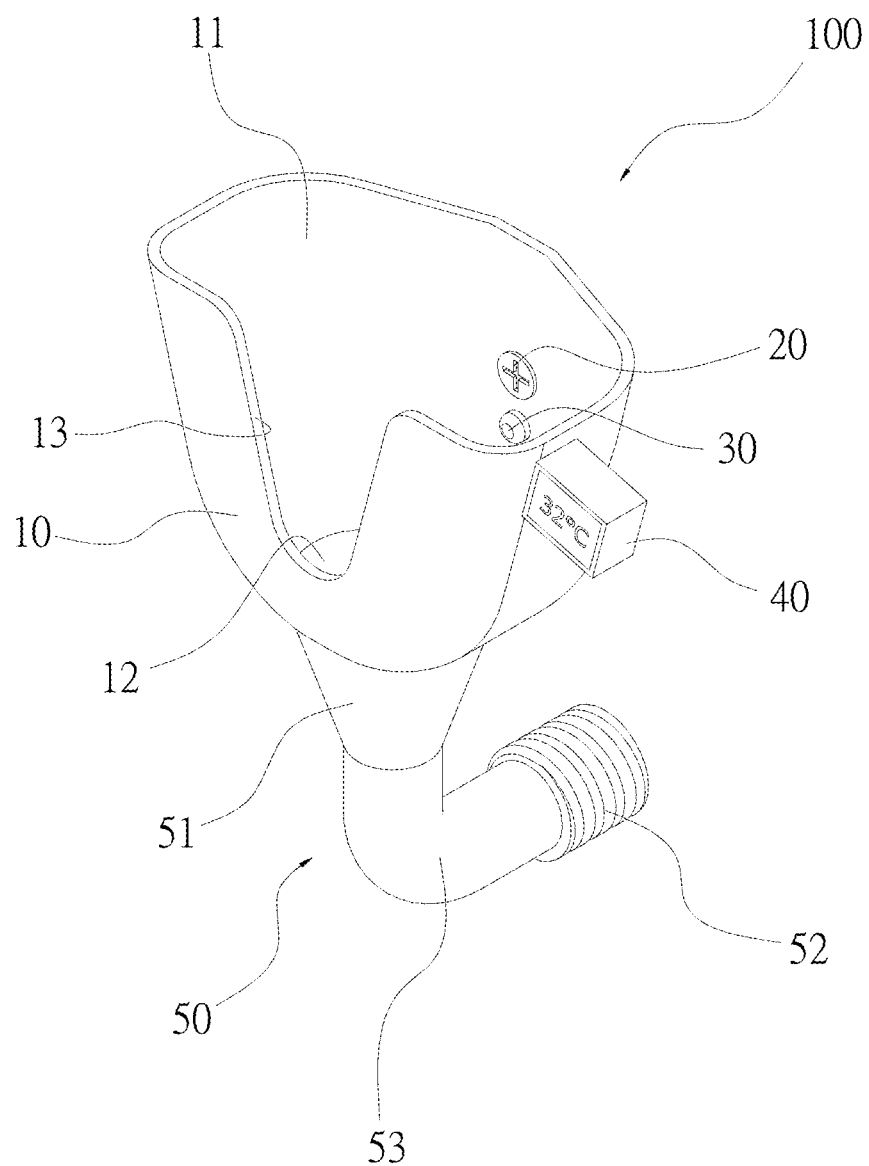
FIG. 1 is a first schematic view of a shower head water collection structure in accordance with an embodiment of the present invention.

Advantages and features of the inventive concept and methods of accomplishing the same may be understood more readily by reference to the following detailed description of embodiments and the accompanying drawings. The inventive concept may, however, be embodied in many different forms and should not be construed as being limited to the embodiments set forth herein. In the drawings, the relative sizes of elements should not be construed as being limited to the proportion and arrangement relationship as shown in the drawings and may be exaggerated for clarity, without departing from the spirit and scope of the present invention.

FIG. 1 is a first schematic view of a shower head water collection structure in accordance with an embodiment of the present invention. As shown in the figure, the shower head water collection structure 100 of the present invention comprises a curved pendant 10, a fixing member 20, a temperature sensor 30, a temperature display 40, and a pipe 50. The curved pendant 10 is a hollow housing having a semi-circular arc shape. The curved pendant 10 has an opening 11 formed at the top of the curved pendant 10 and a plurality of through holes 12 provided at the bottom of the curved pendant 10. One side of the curved pendant 10 is recessed downward from the top to form a curved groove portion 13. The fixing member 20 is disposed on the curved pendant 10 so that the curved pendant 10 can be fixed to a place, such as a wall, through the fixing member 20. The fixing member 20 may be a screw, as an example. The curved pendant 10 may be formed with a perforation. The screw is screwed to the perforation, so that the curved pendant 10 can be fixed and hung up. The temperature sensor 30 is disposed inside the curved pendant 10. The temperature display 40 is disposed outside the curved pendant 10 and connected with the temperature sensor 30. The temperature display 40 is used to display the temperature of the water flow detected by the temperature sensor 30. A first end of the pipe 50 is connected to the bottom of the curved pendant 10. In detail, the first end of the pipe 50 has a connecting portion 51 connected to the bottom of the curved pendant 10. An outer surface of a second end of the pipe 50 is engraved with threads to form a threaded portion 52. The pipe 50 is formed with a bent portion 53 between the connecting portion 51 and the threaded portion 52. Preferably, the connecting portion 51 may be in the form of a funnel. The connecting portion 51 is gradually tapered toward the bent portion 53 from the curved pendant 10.

Figure 2:
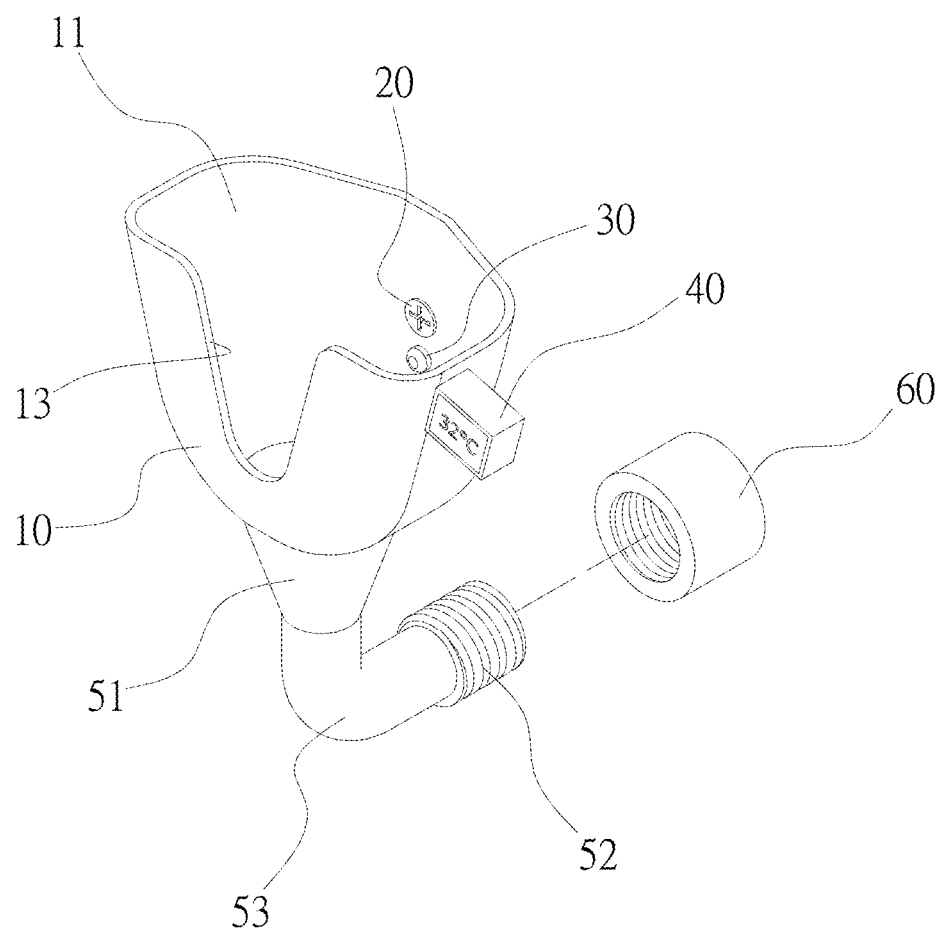
FIG. 2 is a second schematic view of the shower head water collection structure in accordance with the embodiment of the present invention.

FIG. 2 is a second schematic view of the shower head water collection structure in accordance with the embodiment of the present invention. As shown in the figure, the shower head water collection structure of the present invention further comprises a fixing nut 60. The fixing nut 60 may be screwed to the threaded portion 52 of the pipe 50.

Figure 3:
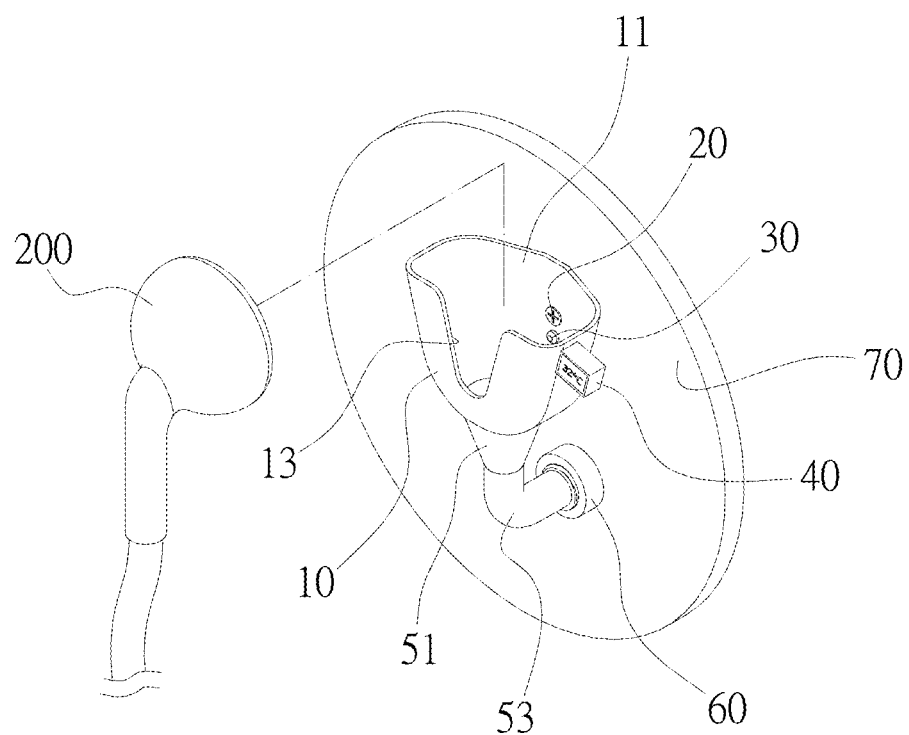
FIG. 3 is a third schematic view of the shower head water collection structure in accordance with the embodiment of the present invention.
Figure 4:
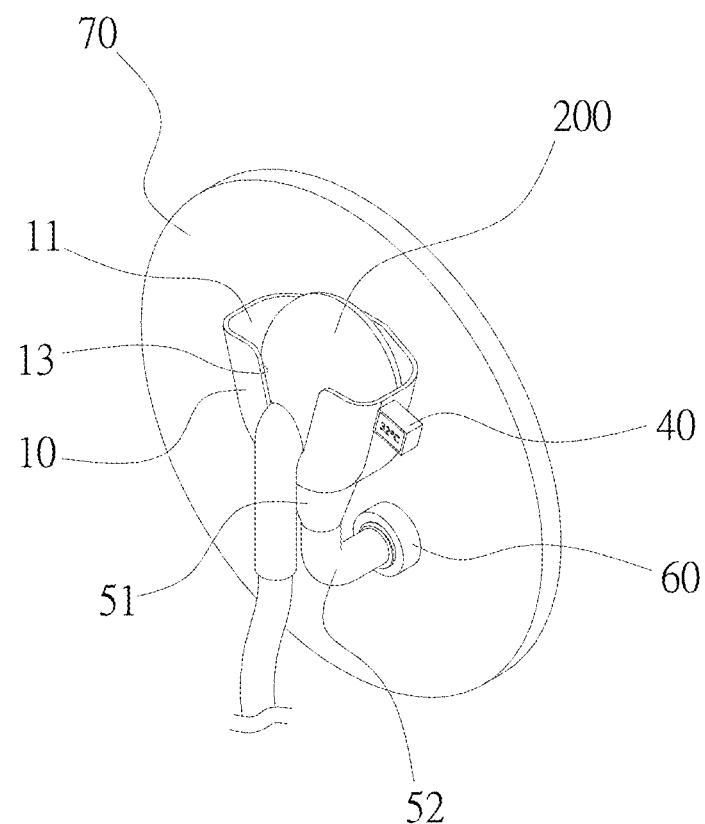
FIG. 4 is a fourth schematic view of the shower head water collection structure in accordance with the embodiment of the present invention.

FIG. 3 is a third schematic view of the shower head water collection structure in accordance with the embodiment of the present invention. FIG. 4 is a fourth schematic view of the shower head water collection structure in accordance with the embodiment of the present invention. As shown in the figures, the shower head water collection structure of the present invention further comprises a seat 70. In a preferred embodiment, the curved pedant 10 may be fixed to the seat 70 through the fixing member 20. The seat 70 is provided with a hole for the fixing nut 60 to be fitted thereon.

Figure 5:
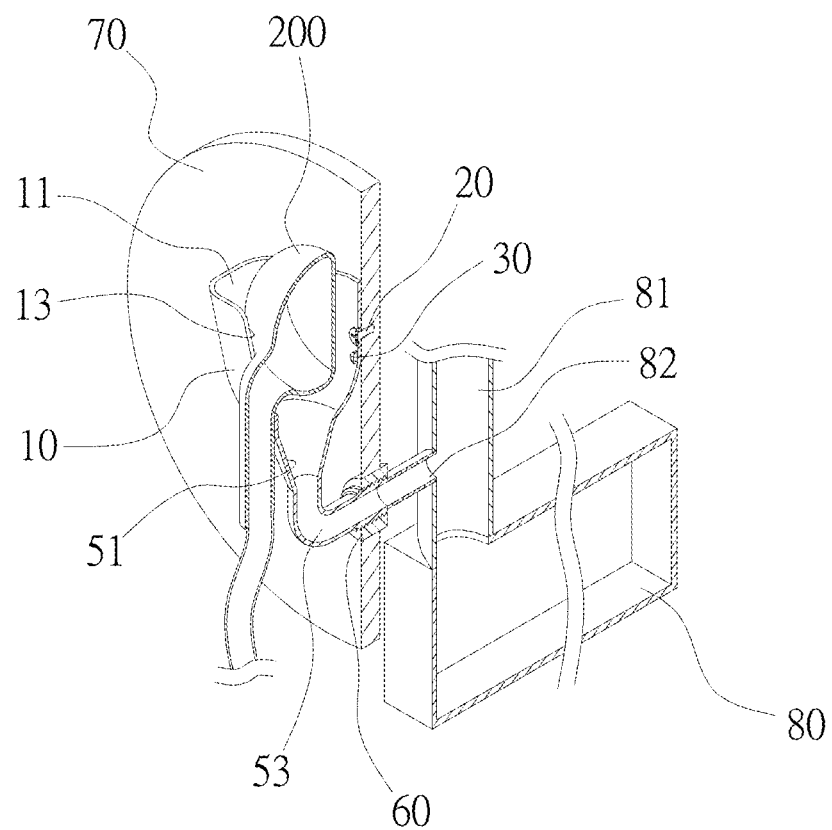
FIG. 5 is a fifth schematic view of the shower head water collection structure in accordance with the embodiment of the present invention.

FIG. 5 is a fifth schematic view of the shower head water collection structure in accordance with the embodiment of the present invention. As shown in the figure, the shower head water collection structure of the present invention further comprises a water collection tank 80 connected with the second end of the pipe 50 opposite the curved pendant 10. In particular, the water collection tank 80 may comprise a main pipe 81. The main pipe 81 is provided with at least one branch pipe 82. The branch pipe 82 is locked with the fixing nut 60, so that the water collection tank 80 is connected to the pipe 50 through the fixing nut 60.

Next, please refer to FIG. 3 to FIG. 5 again. When the shower head water collection structure of the present invention is used, the curved pendant 10 is fixed and hung on the wall or the seat 70, and the curved groove portion 13 of the curved pendant 10 is configured for placement of a shower head 200. When the shower head 200 is to be used for taking a shower, the shower head 200 is first kept on the curved pendant 10 and then the hot water switch is turned on, allowing the water to flow out of the shower head 200. In the beginning, the cold water from the shower head 200 flows through the plurality of through holes 12 at the bottom of the curved pendant 10, the connecting portion 51, the bent portion 53 and the threaded portion 52 of the pipe 50 to the branch pipe 82 of the water collection tank 80, so that the initial cold water can be collected through the water collection tank 80. At the same time, the water flowing out of the shower head 200 can be detected by the temperature sensor 30 disposed on the curved pendant 10, and the water temperature is displayed through the temperature display 40 disposed outside the curved pendant 10 so as to remind the user of the temperature of the water currently flowing out of the shower head 200.

Figure 6:
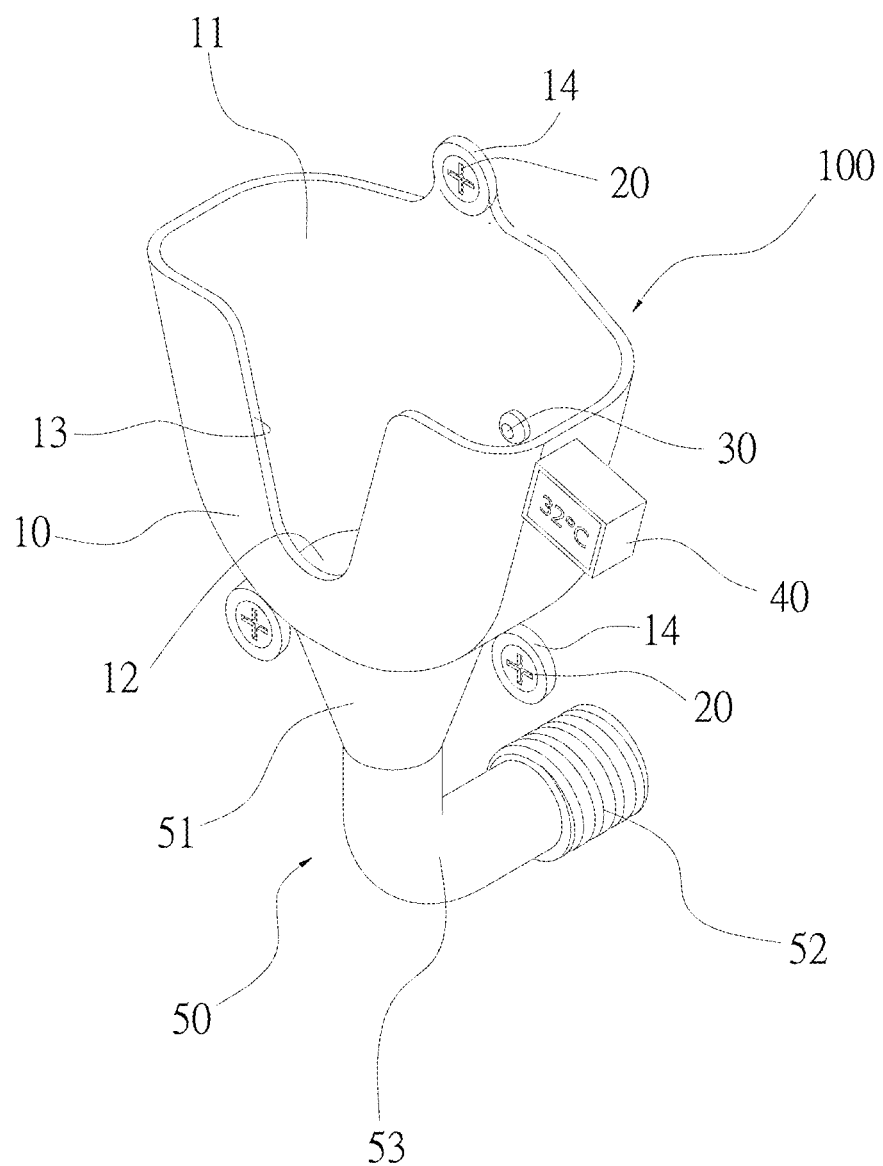
FIG. 6 is a sixth schematic view of the shower head water collection structure in accordance with the embodiment of the present invention.

Further, referring to FIG. 6, the curved pendant 10 is provided with a plurality of lugs 14. The lugs 14 are respectively fixed to the wall or the seat 70 through the fixing members 20, thereby increasing the stability and balance of the curved pendant 10 fixed to the wall or the seat.

Specifically, the shower head water collection structure of the present invention can be used to collect the initial cold water that flows out of the shower head and is not suitable for taking a shower, so that the cold water can flow back for reuse. In fact, the present invention is a water-saving bathroom accessory.

Furthermore, the shower head water collection structure of the present invention uses the temperature sensor disposed inside the curved pendant to sense the temperature of the water flowing out of the shower head. The temperature sensor is electrically connected with the temperature display disposed outside the curved pendant, so that the user can know the temperature of the water flowing out of the shower head through the temperature display. Through the present invention, there is no need for the user to test the water temperature by hand, thereby avoiding a scald and protecting the user effectively. Besides, the shower head water collection structure of the present invention has the opening disposed on the top of the curved pedant and the curved groove portion disposed at the side of the curved pedant, so that the user can hang or take the shower head easily and quickly.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A shower head water collection structure, comprising:
a pendant, being a hollow housing being provided for receiving a shower head, the pendant having an opening at a top thereof and a through hole at a bottom thereof, a front side of the pendant being recessed downward from the top to form a curve groove portion, the curve groove portion being configured for hanging a neck portion of the shower head in such a manner that the shower head is hung on the hollow housing vertically;
a temperature sensor, disposed on a vertical inner side surface of the pendant to measure a temperature of water directly spraying on the vertical inner side surface of the pendant such that the water is directly spraying on the temperature sensor by the shower head whose front surface faces toward the temperature sensor while the neck portion of the shower head hangs on the curve groove portion, wherein a lateral direct-spraying distance between the front surface of the shower head and the temperature sensor is provided such that the shower head does not contact the temperature sensor while the neck portion of the shower head hangs on the curve groove portion, wherein the curve groove portion is a front side of the pendant being recessed downward from the top of the pendant;

a temperature display, disposed on the pendant and connected with the a temperature sensor; and a pipe, connected to the through hole at the bottom of the pendant.

2. The shower head water collection structure as claimed in claim 1, wherein the pendant includes a water collection tank connected with a second end of the pipe.

3. The shower head water collection structure as claimed in claim 2, wherein the first end of the pipe has a connecting portion connected to the bottom of the pendant, the second end of the pipe is provided with a threaded portion, the threaded portion is adapted for connection of a fixing nut, and the fixing nut is adapted for connection of the water collection tank.

4. The shower head water collection structure as claimed in claim 3, wherein the pipe is formed with a bent portion between the connecting portion and the threaded portion.

5. The shower head water collection structure as claimed in claim 3, wherein the connecting portion is in the form of a funnel and is gradually tapered in a direction from the first end of the pipe to the second end of the pipe.

6. The shower head water collection structure as claimed in claim 2, wherein the water collection tank comprises a main pipe, the main pipe is provided with at least one branch pipe, and the branch pipe is connected with the fixing nut.

7. The shower head water collection structure as claimed in claim 1, wherein the-pendant includes a fixing member, and the pendant is fixed to a wall or a seat through the fixing member.

8. The shower head water collection structure as claimed in claim 7, wherein the fixing member is a screw.

9. The shower head water collection structure as claimed in claim 7, wherein the-pendant is provided with a plurality of lugs each fixed to the wall or the seat through the fixing member.

* * * * *